United States Patent [19]

Boddey et al.

[11] Patent Number: 4,805,519
[45] Date of Patent: Feb. 21, 1989

[54] CONTROL SYSTEM

[75] Inventors: Derek O. Boddey, Colchester; Alan G. Young, Ipswich, both of England

[73] Assignee: EDI Engineering Limited, Ipswich, England

[21] Appl. No.: 77,899

[22] Filed: Jul. 27, 1987

[51] Int. Cl.[4] .......................................... F24F 11/00
[52] U.S. Cl. ..................................... 98/1; 137/487.5; 137/624.11; 137/594; 236/1 B; 340/825.06; 165/22
[58] Field of Search ................... 98/1, 41.1, 41.2, 41.3; 137/487.5, 624.11, 594; 236/1 B; 165/22; 340/825.06, 825.07

[56] References Cited

U.S. PATENT DOCUMENTS 3,699,989 10/1972 O'Connor et al. ......... 251/129.04 X
4,019,172 4/1977 Srodes ........................... 340/505 X
4,410,883 10/1983 Swiston, Sr. .................. 340/505 X
4,468,655 8/1984 Iwata ............................. 340/505 X
4,574,283 3/1986 Arakawa et al. .............. 236/1 B X
4,679,045 7/1987 Sadamori et al. ............. 340/825.07

Primary Examiner—Harold Joyce
Attorney, Agent, or Firm—Collard, Roe & Galgano

[57] ABSTRACT

A system for controlling the operation of a plurality of dampers serving ventilation apertures in the structure of a building, which system comprises a plurality of actuators, one or more to be associated with each damper and to actuate the damper between an open and a closed position; the actuators incorporating means for receiving a signal from a controller, for identifying that that signal contains instructions relevant to the damper which that actuator actuates; the plurality of actuators being adapted to be connected in series with the controller via a single connecting cable.

7 Claims, 1 Drawing Sheet

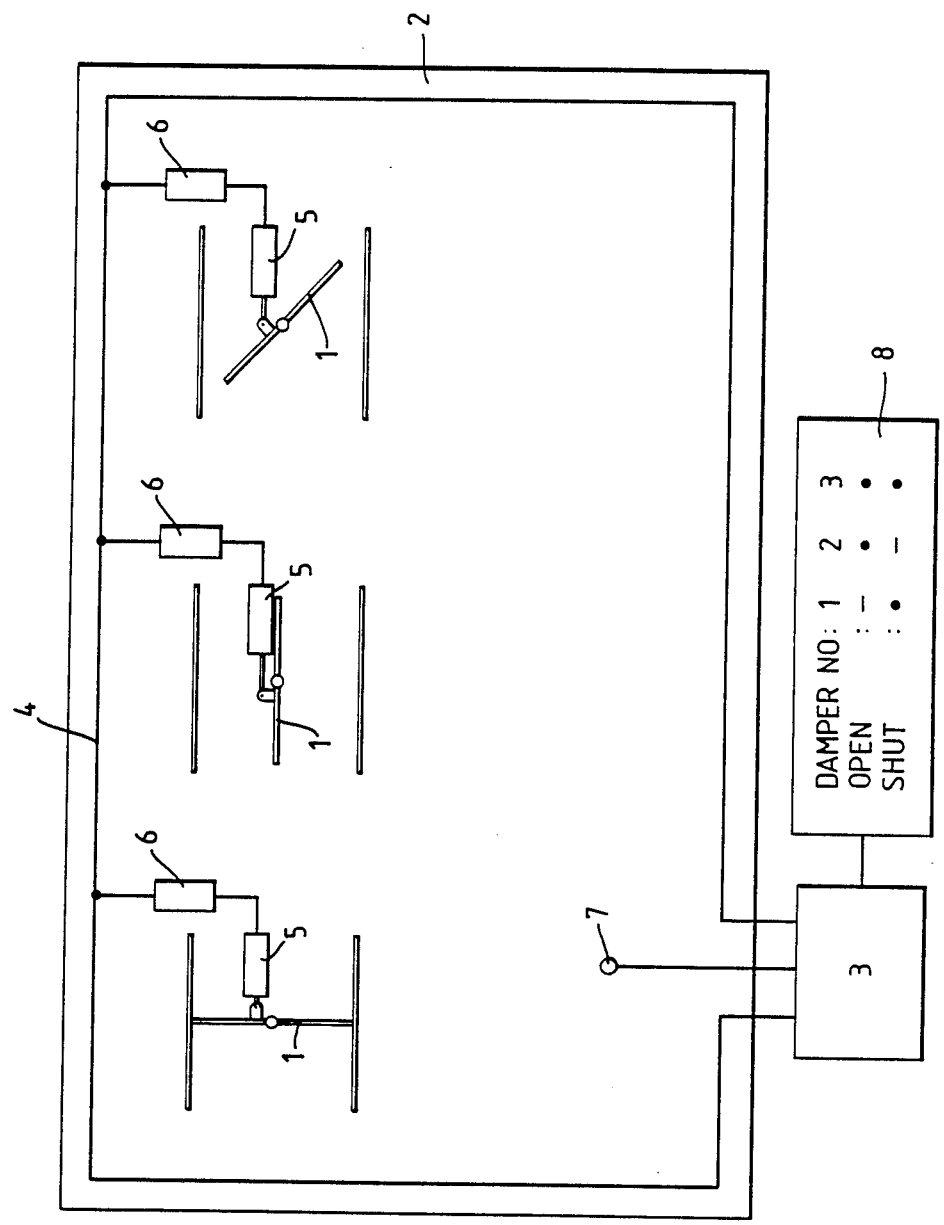

CONTROL SYSTEM

The present invention relates to a control system, notably to a system for controlling the operation of ventilation dampers in buildings.

BACKGROUND OF THE INVENTION

Many buildings, notably industrial or office premises, have ventilation apertures in the walls or roofs thereof through which the flow of air is controlled by dampers, shutters, louvres or the like. For convenience, the term damper will be used herein to denote in general all forms of closure member which act to close an aperture. In the event of a fire, it is necessary that the dampers be closed to minimise the access of air to the affected area. Hitherto, the operation of the dampers has been achieved by thermally responsive elements which automatically close the dampers in response to a temperature rise detected by a suitable sensor or by the use of a bimetallic strip to actuate the closure mechanism. However, this results in dampers which are either fully closed or fully open and which require manual re-setting in the event that they are accidentally actuated. Furthermore, it is not possible to have some dampers open in an affected area where others are closed, which may give rise to inflexibility in operating the damper system.

As an alternative to thermally actuated mechanical closure means, it has been proposed to operate each individual damper by an electro-mechanical means from a central control unit. Such a system comprises a series of damper actuating motors or the like each connected to the central control unit via a cable so that each motor receives its instructions from the control unit and can be operated independently of the others. However, this requires major expense and disruption of the premises during installation of the system due to the number of cables which must be provided. Furthermore, if any one of the cables is damaged at any time, control of the damper which that cable serves is lost.

We have now devised a system for controlling the operation of a system of dampers which reduces the number of cables required, which enables the dampers to be operated individually and which enables control of a damper to be maintained even where a cable is damaged.

SUMMARY OF THE INVENTION

Accordingly, the present invention provides a system for controlling the operation of a plurality of dampers serving ventilation apertures in the structure of a building, which system comprises a plurality of actuation means, one or more to be associated with each damper and to actuate the damper between an open and a closed position; said actuation means incorporating means for receiving a signal from a control means, for identifying that signal contains instructions relevant to the damper which that means actuates; said plurality of actuation means being adapted to be connected in series with the control means via a single connecting cable. The invention also provides a damper assembly provided with an actuation means according to the invention; and a damper system installed in a building or other structure whose operation is controlled by a damper assembly of the invention.

The invention further provides a method for operating a damper system of the invention installed in a structure, notably a factory or other business premises, which method comprises:

a. sending a signal from the control means to the actuation means through the connecting cable, which signal contains a component identifying the actuation means to which the signal is addressed and a component which contains an operating instruction to that actuation means, preferably the signal also contains one or more components for identifying the signal as a valid signal;

b. scanning that signal at each actuation means so that only the actuation means to which the signal is addressed accepts the signal;

c. in response to the instruction component of the signal addressed to it the actuation means operates the damper in the manner instructed. Preferably, the actuation means incorporates means for transmitting a signal to the control means to indicate that a signal has been received from the control means. That signal preferably reports the operation of the damper to the control unit for verification that the damper has been operated in accordance with the instruction issued from the control means.

The invention utilises a single data transmission cable to which the damper actuators control units are connected in series. As a result the amount of cable required to instal the system of the invention is reduced as compared to conventional systems. Also, if it is desired to extend the system, extra cable and actuation control units can readily be attached to an existing system without the need to extend the new wiring back to the central control unit as hitherto. If the transmission cable should be damaged at one point, signals will still reach the actuation control units via either arm of the circuit, thus preserving the integrity of the system. It is also possible to determine the point at which the cable has been damaged, thus facilitating repair and maintenance of the system. Where the cable is broken at two or more points the control unit will not receive the return signals from the actuator control unit and this can be used to actuate an alarm to alert an operator of the system. By Operating the dampers individually, it is possible to hold open some dampers in an area of the structure, for example to maintain a smoke free corridor through which occupants of a building can escape or to encourage an air flow into or through the building to retard the forward movement of a fire front within the building. Furthermore, the system of the invention can be used to control dampers independently in a building on a floor by floor or area by area basis rather than throughout the whole building.

BRIEF DESCRIPTION OF THE DRAWING

To aid understanding of the invention it will hereinafter be described with respect to a preferred form thereof and with respect to the accompanying drawing which is a diagrammatic block diagram of the system installed in a building.

DESCRIPTION OF THE PREFERRED EMBODIMENT

The system of the invention can be installed in any structure where it is desired to operate dampers. The structure need not be inhabited. For example, the system can be incorporated into electrical sub-stations, automatic telephone exchanges or boiler rooms or other un-manned buildings. However, the present invention is of especial application in buildings such as offices, warehouses or factories, where the dampers provide ventilation to the building and in which the dampers must be closed in the case of fire or other accident. For convenience, the invention will be described in terms of a single bay of an open plan building as shown in the drawing, but it can be applied to compartmented buildings, for example office blocks, and the system can extend over more than one bay or compartment. If desired, the system can be installed as a series of separate circuits radiating from one or more central control units, for example where one system responds to one type of sensor and another responds to different sensors.

The system can be used to operate a wide range of types of damper, e.g. hinged windows or doors, but is of especial use in operating single shutter or multiple louvre type dampers as commonly used in industrial premises.

The system of the invention comprises a plurality of dampers 1 mounted in the wall or roof of the building 2 and connected in series with a control unit 3 via a data transmission cable 4. Each damper is provided with means 5 for operating it from the fully open to a fully closed position. If desired, the operating means 5 can be used to achieve intermediate positions if close control of the ventilation of the building is required. The operating means 5 for the damper can be of any suitable type, e.g. a mechanical or thermo-mechanical device. However, since the signal from the control unit 3 is usually an electrical signal, it is preferred to use an electrical or electro-mechanical operating means 5 to move the damper 1. Preferably, the damper is operated by a solenoid and suitable dampers and operating means are commercially available and can be used as such.

Each damper 1 is provided with a signal receiver and interpreting unit 6 which receives signals along the data transmission cable from the control unit 3. Typically, the unit 6 will incorporate suitable electronic circuitry to enable the unit to scan signals passing along the cable, to identify those having the characteristic address format for that unit and then to receive the instruction component contained in that signal to operate the damper operating means 5. The unit 6 will typically incorporate a suitable microprocessor having the necessary program held within it so that each damper assembly incorporates the necessary local intelligence to operate the damper and to fail into the damper safe position if the system should break down.

The signals from the central unit 3 carry the necessary information to the units 6 in any suitable form, for example as signals of different frequency. However, it is preferred that the signals be in the form of binary coded pulses with one part of the pulse carrying the address information, another part the open or shut instruction and, preferably, a third part carrying a verification code to ensure that the units 6 reject extraneous or corrupted signals.

It is preferred that the unit 6 is capable of transmitting signals to the control unit 3 to indicate the receipt of signals from the unit 3 and the status of the damper 1. Thus, unit 6 can send a signal to the unit 3 reproducing the address and verification code of the signal it receives and incorporating a component reflecting whether the damper is open or shut. If desired, the unit 6 can compare that information with that contained in the signal it received from unit 3 to ensure that they conform and then send a signal to unit 3 confirming this or actuating an alarm if the information does not correspond. Alternatively, this comparison can be done at the unit 3.

Preferably, the unit 6, the operating mechanism 5 or the damper 1 itself incorporate means for closing the damper in the event that unit 6 does not receive a signal within a predetermined time interval from unit 3 and/or if the operating means 5 fails for any reason.

The operation of the dampers 1 is controlled from a control unit 3 which sends the signals to the units 6 in the required form in response to the conditions within the building. Unit 3 itself receives signals from suitable condition monitoring sensors 7 throughout the building. For example, unit 3 can receive information relating to the temperature within the building and can open or close the dampers to maintain adequate ventilation through the building to maintain the temperature within the building within a desired range. Other sensors can monitor the presence of smoke or excessive temperatures to indicate if a fire has broken out or to monitor other incidents and can feed their signals to unit 3.

As indicated above, unit 3 preferably transmits signals to each of the units 6 at predetermined intervals so that the integrity of the system is subject to repeated checks. It is also preferred that unit 3 incorporate means for receiving signals from the units 6 which indicate that the unit 6 has received and correctly executed an instruction from unit 3. Typically, such a means will include a time monitor such that if no reporting signal is received from unit 6 within a preset time after the instructing signal has been sent from unit 3, a further signal is sent to the relevant unit 6 instructing it to put the damper it controls into the safe position.

It is also preferred that unit 3 incorporates means for displaying the status of the dampers it serves and also means for manually over-riding the control of one or more of the dampers to reflect special conditions in the locality of that damper. Typically, the unit 3 will incorporate a visual and/or audio display 8 or warning to indicate malfunction of the dampers. If desired, unit 3 can be programmed to actuate certain patterns of damper operation in response to signals from the sensors 7 so that in an emergency the system automatically carries out certain containment measures whilst sounding an alarm to the operator. This may reduce the time delay between a condition being sensed and the operator taking the required measures.

The sensors 7 and unit 3 can be designed and constructed in a number of ways using conventional materials and techniques.

The control unit 3 and the damper control units 6 are connected in series via a data transmission cable in a manner similar to an electric ring main. If desired the data transmission can be associated with a power cable which supplies the necessary electric power to the units 6 and/or the damper actuation means 5 of the damper assemblies. Where the units 6 incorporate suitable decoding means, the signals from the control unit 3 can be sent along the same cable as carries the power to the damper assemblies. The cable is preferably sheathed in a fire resistant or other protective sleeve to reduce the risk of breakage or damage to the cable. The cable can be of conventional design and construction.

The invention has been described above in terms of a damper which is opened or shut. However, the invention can be applied to other forms of aperture closure means, for example fire doors and the like.

What we claim is:

1. A system for controlling the operation of a plurality of dampers serving ventilation apertures in the structure of a building, which system comprises a plurality of actuation means, one or more to be associated with each damper and to actuate the damper between an open and a closed position; said actuation means incorporating means for receiving a signal from a control means, for identifying that signal contains instructions relevant to the damper which that means actuates; said plurality of actuation means being adapted to be connected in series on a single connecting cable, with the connecting cable forming a loop, the two ends of which are connected to the control means.

2. A system as claimed in claim 1, wherein the actuation means incorporates means for transmitting a signal to the control means to indicate that a signal has been received by that actuation means from the control means.

3. A system as claimed in claim 2, wherein the said signal reports the operation of the damper to the control means for verification that the damper has been operated in accordance with the instruction issued from the control means.

4. A system as claimed in claim 1 wherein the signal transmitted from the control means to the damper actuation means is in the form of binary coded pulses with one part of the pulse carrying the address information, another part the open or shut instruction and, optionally, a third part carrying a verification code to ensure that the actuation means rejects extraneous or corrupted signals.

5. A system as claimed in claim 2 wherein the control means is adapted to compare the signal from the damper with the damper operating signal sent from the control means to ensure that the signals conform; and wherein the control means is provided with means for actuating an alarm if the signals do not conform.

6. A system as claimed in claim 2 wherein there is provided means for causing the actuation means to close the associated damper in the event that the control means does not receive a signal within a predetermined time interval from the damper actuation means.

7. A ventilation installation for a building, the installation comprising a plurality of dampers serving ventilation apertures in the structure of the building and a control system for controlling the operation of the dampers, which system comprises a plurality of actuation means, one or more being connected to each damper and arranged to actuate the damper between an open and a closed position; said actuation means incorporating means for receiving a signal from a control means, for identifying that signal contains instructions relevant to the damper which that means actuates; said plurality of actuation means being adapted to be connected in series on a single connecting cable, with the connecting cable forming a loop, the two ends of which are connected to the control means.

* * * * *